D. BILLIARD.
EXPANSION VALVE.
APPLICATION FILED NOV. 3, 1908.

915,543.

Patented Mar. 16, 1909.

Witnesses
Samuel Payne
K. H. Butler

Inventor
D. Billiard.
By H. C. Evert & Co.
Attorneys.

UNITED STATES PATENT OFFICE.

DANIEL BILLIARD, OF PITTSBURG, PENNSYLVANIA.

EXPANSION-VALVE.

No. 915,543.  Specification of Letters Patent.  Patented March 16, 1909.

Application filed November 3, 1908. Serial No. 460,952.

*To all whom it may concern:*

Be it known that I, DANIEL BILLIARD, a citizen of the United States of America, residing at Pittsburg, in the county of Allegheny and State of Pennsylvania, have invented certain new and useful Improvements in Expansion-Valves, of which the following is a specification, reference being had therein to the accompanying drawing.

This invention relates to expansion valves particularly designed for refrigerating machinery, wherein ammonia in solution is used as a freezing agent for water.

The object of my invention is the provision of positive and reliable means in connection with a valve plug for allowing the same to expand and at the same time maintain a tight connection. In connection with the valve plug, a valve stem is used coöperating with the valve plug on the principle of a "needle" valve, whereby the quantity of ammonia passing through the valve can be minutely regulated.

I attain the above objects by a valve that is simple in construction, durable and highly efficient for the purposes for which it is intended.

Figure 1:
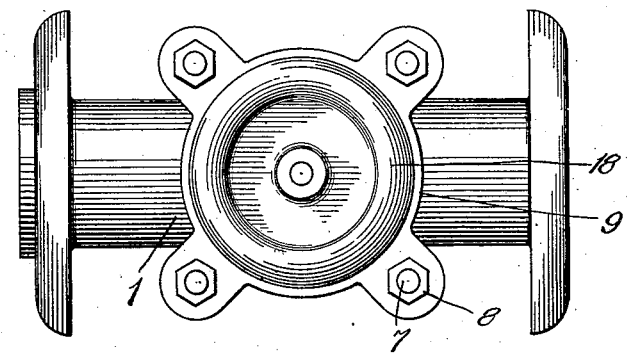
Figure 2:
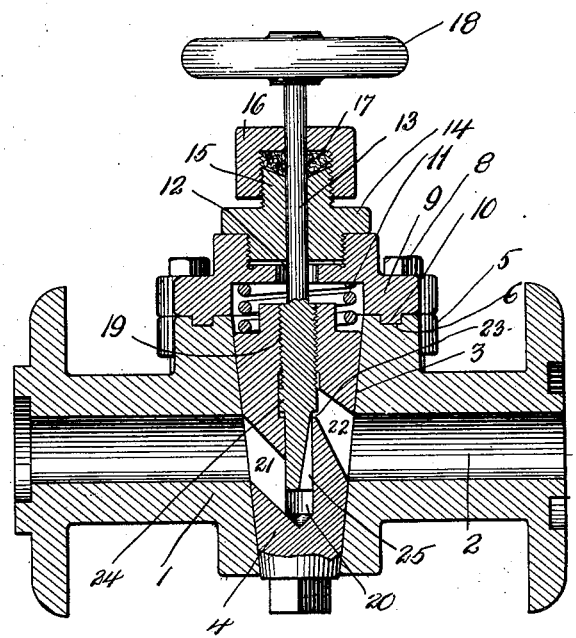

Referring to the drawing forming a part of this specification, Figure 1 is a plan of my valve, and Fig. 2 is a vertical longitudinal sectional view of the same.

In the accompanying drawings, 1 designates a valve body having a longitudinal bore 2 intersected by a vertical tapering plug seat 3 in which is loosely mounted a tapering plug 4. The upper end of the valve body 1 is provided with radially disposed lugs 5 and with an annular groove 6. Secured to the lugs 5 by bolts 7 and nuts 8 is a cap 9 having a depending annular tongue 10 adapted to fit in the groove 6 of the valve body 1. Interposed between the cap 9 and the top of the plug 4 is a coil spring 11 for normally holding the plug 4 tightly in the seat 3.

The cap 9 is provided with a central opening 12 for a valve stem 13, and surrounding said valve stem is a plug 14, which is threaded into the cap 9, and provided with a contracted threaded portion 15 for a gland 16. Packing 17 is arranged between the plug and the gland for insuring a non-leakable connection.

The upper end of the valve stem 13 is provided with a hand wheel 18, while the lower end of said stem is adjustably mounted in the plug 4 by threads 19. This plug is provided with a central vertical socket 20 to receive the lower end of the stem 13 and communicating with said socket are two angularly disposed ports 21 and 22, said ports communicating with the longitudinal bore 2 of the valve body. The intersection of the port 22 and the socket 20 provide an annular seat or shoulder 23 for an annular enlargement 24 carried by the valve stem 13. The valve stem 13 is provided with a V-shaped groove 25 extending from the enlargement 24 to the lower end of said stem, this groove being adapted to establish communication between the ports 21 and 22, and according to its position determine the communication between one end of the bore 2 and the opposite end thereof. As shown in Fig. 2 of the drawings, the enlargement 24 is slightly raised above the seat 23, allowing a very small passage for ammonia between the ports 21 and 22, and the area of this passage can be increased or decreased by the adjustment of the valve stem 13.

The parts of my valve are easily and quickly assembled and are free from injury by ordinary use. It is obvious that the spring 11 will compensate for any expansion or contraction of the plug 4 without affecting communication between the ports 21 and 22.

While in the drawings forming a part of this application there is illustrated the preferred embodiments of my invention, it is to be understood that the same can be varied or changed without departing from the spirit of the invention.

Having now described my invention what I claim as new, is:—

1. The combination with a valve body having a longitudinal bore formed therein intersected by a vertical tapering seat, a tapering plug loosely mounted in said seat, said plug having a vertical socket formed therein and angularly disposed ports establishing communication between said bore and said socket, a cap mounted upon said valve body, a coil spring interposed between the upper end of said plug and said cap for normally holding said plug tightly within the valve body seat, a valve stem threaded in said plug and extending upwardly through said cap, a stuffing box carried by said cap and surrounding said stem, a hand wheel mounted upon the upper end of said valve stem, an annular enlargement carried by said valve stem within said socket and adapted to control the communication between said ports and said socket, said valve stem having the lower end thereof provided with a V-shaped groove, substantially as and for the purpose herein described.

2. The combination with a valve body having a longitudinal bore formed therein intersected by a vertical tapering seat, a plug loosely mounted in said seat, said plug having a socket formed therein, and ports establishing communication between said bore and said socket, a cap mounted upon said valve body, a spring arranged in said cap and engaging said plug for tightly holding said plug within said seat, a valve stem adjustably mounted in said plug and extending upwardly through said cap, and an annular enlargement carried by said valve stem within said socket for controlling communication between said ports, said valve stem having a groove formed therein adapted to establish communication between said socket and said ports.

3. The combination with a valve body having a longitudinal bore formed therein intersected by a vertical tapering seat, a plug loosely mounted in said seat, said plug having ports formed therein adapted to establish a passage through said plug, a cap for closing one end of said bore a valve stem adjustably mounted in said plug and having the lower end thereof provided with a groove for establishing communication between said ports, said stem projecting through said cap, and a spring interposed between the cap and plug for tightly holding the plug against said seat.

In testimony whereof I affix my signature in the presence of two witnesses.

DANIEL BILLIARD.

Witnesses:
   Max H. Srolovitz,
   C. V. Brooks.